United States Patent
Strachan et al.

(10) Patent No.: US 10,846,296 B2
(45) Date of Patent: Nov. 24, 2020

(54) K-SAT FILTER QUERYING USING TERNARY CONTENT-ADDRESSABLE MEMORY

(71) Applicant: Hewlett Packard Enterprise Development LP, Houston, TX (US)

(72) Inventors: John Paul Strachan, San Carlos, CA (US); Catherine Graves, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 278 days.

(21) Appl. No.: 15/966,817

(22) Filed: Apr. 30, 2018

(65) Prior Publication Data

US 2019/0332708 A1 Oct. 31, 2019

(51) Int. Cl.
*G06F 16/00* (2019.01)
*G06F 16/2458* (2019.01)
*G06F 21/55* (2013.01)

(52) U.S. Cl.
CPC ........ *G06F 16/2468* (2019.01); *G06F 21/552* (2013.01); *G06F 2221/034* (2013.01)

(58) Field of Classification Search
CPC .............. G06F 21/552; G06F 16/2468; G06F 16/90335; G06F 2221/034; G06F 16/00
See application file for complete search history.

(56) References Cited

U.S. PATENT DOCUMENTS

| | | | |
|---|---|---|---|
| 8,885,379 B2 | 11/2014 | Alvarez-herault et al. | |
| 9,753,484 B1* | 9/2017 | Marek | G06F 16/90335 |
| 2004/0019468 A1* | 1/2004 | De Moura | G06F 11/3684 |
| | | | 703/2 |
| 2013/0054886 A1 | 2/2013 | Eshraghian et al. | |
| 2015/0220674 A1* | 8/2015 | Mihal | G06F 30/392 |
| | | | 716/113 |

OTHER PUBLICATIONS

A. S. M. Abdul Kader and Mikhail Dorojevets (2017), "Novel integration of Dimetheus and WalkSAT solvers for k-SAT filter construction", pp. 1-5.*

Sean A. Weaver and Katrina J. Ray, "Satisfiability-based Set Membership Filters", pp. 129-148 (Year: 2014).*

(Continued)

*Primary Examiner* — Merilyn P Nguyen

(74) *Attorney, Agent, or Firm* — Michael A. Dryja

(57) ABSTRACT

Filters are represented as k-SAT solutions. A filter query includes a k-SAT clause having literals pertaining to variables. A ternary content-addressable memory (TCAM) has cells programmed in correspondence with the k-SAT solutions. Input column lines of the TCAM that correspond to variables to which the literals of the k-SAT clause pertain are set in accordance with inversions of the literals. Input column lines of the TCAM that correspond to variables to which no literal of the k-SAT clause pertains are set in accordance with a "don't care" state. Responsive to any output match row line of the TCAM being set, the filter query is indicated as failing to satisfy the filters. Responsive to no output match row line of the TCAM being set, the filter query is indicated as satisfying the filters.

19 Claims, 5 Drawing Sheets

(56) References Cited

OTHER PUBLICATIONS

Yu, F. et al.; "SSA: a power and memory efficient scheme to multi-match packet classification"; ANCS'05, Oct. 26-28, 2005; pp. 105-113.

Xu, M. et al.; "Efficient Two Dimensional-IP Routing: an Incremental Deployment Design"; May 21, 2013; Comput. Netw.(2013), http://dx.doi.org/10.1016/j.bjp.2013.11.004, 17 p.

Junsangsri, P. et al.; "A memristor-based TCAM (ternary content addressable memory) cell: design and evaluation"; May 3-4, 2012; pp. 311-314.

* cited by examiner

K-SAT FILTER QUERYING USING TERNARY CONTENT-ADDRESSABLE MEMORY

GOVERNMENT LICENSE RIGHTS

This invention was made with US government support under contract 2017-17013000002, awarded by the Intelligence Advanced Research Projects Activity (AIRPA). The government has certain rights in the invention.

BACKGROUND

With the advent of the Internet, computing devices with networking capability are potentially able to communicate with nearly any other computing device that is also connected to the Internet. Such ubiquitous communication capabilities have opened up usage scenarios and opportunities that were nearly unimaginable prior to the Internet. However, the Internet has proven to have drawbacks as well: nefarious users are now more easily able to penetrate local networks and access the computing devices connected to such networks, to both access the data stored on the computing devices and use the devices for their own malevolent purposes.

DETAILED DESCRIPTION

Figure 1:
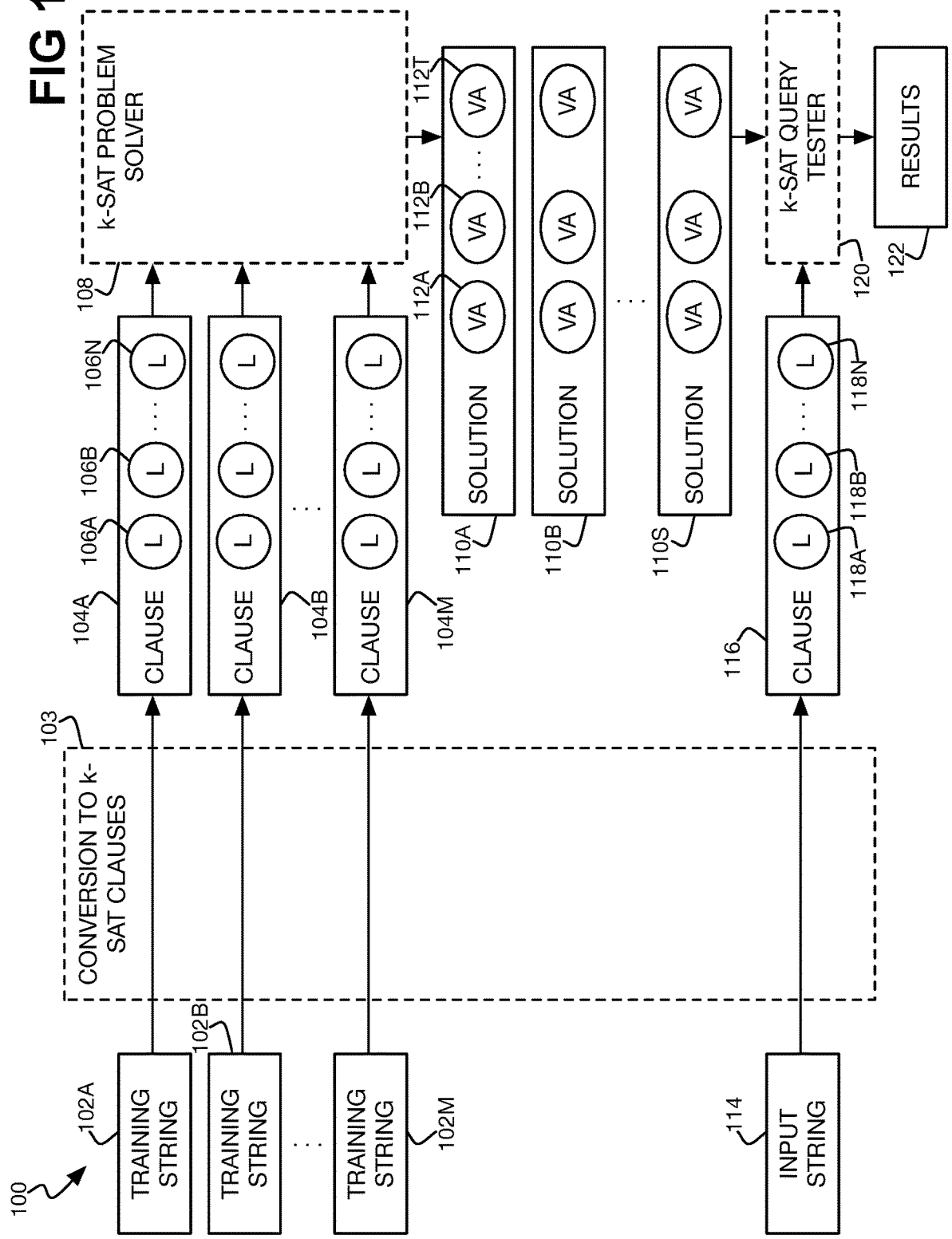
FIG. 1 is a diagram of an example k-SAT filtering technique that can use a ternary content-addressable memory (TCAM).

As noted in the background section, the increasing interconnectedness of computing devices on a global scale has come the potential for computing devices to have their data and the control of the devices themselves compromised. In enterprise and other environments, computing devices like desktop and laptop computers, among other types of computing devices, are commonly connected to a local area network, which itself is connected to outside networks like the Internet via one or more managed points of access. These managed points of access can be responsible for ensuring the safety of data passing through them, before the data arrives at their intended destination computing devices on the network.

One way to accomplish such network security is to filter incoming (and potentially outgoing) data for known security threats, including malware, viruses, network attacks, and other types of security threats. Strings of data are thus compared to security threat signatures. If a data string of a data packet does not match an existing threat signature, then the packet may be permitted to pass (i.e., enter the local network, or leave the local network). If the data string does match an existing threat signature, its data packet can be tagged as an actual or potential security threat and its passage at least temporarily prevented. If tagged as a potential security threat, the data packet may undergo further scrutiny to determine if the packet indeed poses a threat.

One type of filtering technique that can be employed as a network security filtering technique is k-SAT filtering. In k-SAT filtering, known security threat signatures can be passed through multiple hash functions, but to realize what are referred to as clauses, which are defined as disjunctions of literals, which themselves are variables or the negations of variables. A k-SAT solver is employed to identify independent solutions, or formulas, that satisfy every clause. To determine if a data string of a data packet is a potential security threat, the hash functions are again also applied to the data string, with the resulting hashes corresponding to the data string's clause. If all previously identified solutions satisfy this clause, then the data packet is a potential security threat. If one or more previously identified solutions do not satisfy this clause, then the packet is considered not a threat.

In k-SAT filtering, therefore, the solutions can be generated from known security threat signatures in a preprocessing stage, and then in a processing stage, clauses of literals are generated from data strings of data packets and tested against the solutions, which represent the filters in the k-SAT filtering technique. Particularly as to the latter, how quickly k-SAT clauses of literals corresponding to data packet data strings can be tested or applied against the filters can affect if not dictate the throughput of such a filtering technique. For scenarios in which large amounts of data are received from and/or transmitted to an outside network, therefore, the ability to test in real time or in near-real time k-SAT clauses to which the data has been converted can be important to maintain network communication performance.

Techniques described herein provide for efficient k-SAT filter querying, where such querying is testing or applying a k-SAT clause of literals against k-SAT solutions representing filters to determine whether the clause satisfies the solutions. The described k-SAT filtering techniques can thus be used in filtering applications, including network security filtering applications. The k-SAT filtering techniques described herein novelly leverage a ternary content addressable memory (TCAM) to encode the k-SAT solutions. One specific type of TCAM that can be employed in this respect is a memristor-implemented TCAM.

FIG. 1 shows an example k-SAT filtering technique 100 that can use a TCAM. Training strings 102A, 102B, . . . , 102M, which are collectively referred to as the training strings 102, are employed to train the k-SAT filters. For example, in the context of network security, each training string 102 can be a series of characters that represents a known security threat, such as a virus or malware signature, and so on.

As represented by block 103, the training strings 102 are respectively converted to k-SAT clauses 104A, 104B, . . . , 104M, which are collectively referred to as the k-SAT clauses 104. Each k-SAT clause 104 is a disjunction of literals 106A, 106B, . . . , 106N, which are collectively referred to as the literals 106. The number of literals 106 in each clause 104 is equal to k, which is the "k" in k-SAT, where "SAT" stands for satisfiability.

Each literal 106 is a corresponding variable, or atom, or a negation or inverse of a corresponding variable, or atom. Each k-SAT clause 104 is a disjunction of k of these literals 106. The block 103 can be implemented by applying a hash to a training string 102 to identify the literals 106 of the clause 104. For example, in one implementation, the block 103 can be implemented by using the string-to-clause technique described in the patent application entitled "hash computation using memristor-implemented dot product engine," filed on Apr. 30, 2018 and assigned patent application Ser. No. 15/966,719.

Mathematically, there can be a total set of L Boolean variables $x_1, x_2, \ldots, x_L$. In a logical expression, such as a k-SAT clause, these variables may appear as variables, $x_j$, or negations of the variables, $\bar{x}_j$. A k-SAT clause 104 is composed of literals 106, $y_j$, where $y_j \in \{x_1, \bar{x}_1, x_2, \bar{x}_2, \ldots, x_L, \bar{x}_L\}$ for $j=1 \ldots k$. More specifically, each k-SAT clause 104 is a disjunction of k of such literals, or $y_1 \vee y_2 \vee \ldots \vee y_k$, where $y_j \in \{x_1, \bar{x}_1, x_2, \bar{x}_2, \ldots, x_L, \bar{x}_L\}$ for $j=1 \ldots k$.

As represented by block 108, the clauses 104 are solved by a k-SAT problem solver to generate k-SAT solutions 110A, 110B, ..., 110S, which are collectively referred to as the k-SAT solutions 110. The number s of the k-SAT solutions 110 can be specified. Each k-SAT solutions 110 is defined as a number of variable assignments 112A, 112B, ..., 112T, which are collectively referred to as the variable assignments 112. The number T of variable assignments 112 of each k-SAT solution 110 is equal to the total number of variables L represented in the set of literals from which N literals 106 are included within each k-SAT clause 104. Each variable assignment 112 thus corresponds to one of the L variables and specifies a logic one (true) or a logic zero (false) of that variable. This, in turn, assigns a logic one (true) or a logic zero (false) to each literal reflecting the underlying variables. A k-SAT solution 110 is said to satisfy a k-SAT clause of literals if each variable assignment 112 of the solution 110 yields the clause to be logically true.

The k-SAT problem solver represented by block 108 generates the specified s number of k-SAT solutions 110 that each satisfy the clause 104 corresponding to each training string 102. That is, every k-SAT solution 110 satisfies the clause 104 of every training string 102. The block 108 can be implemented by a k-SAT problem solving technique. One example of such a technique is described in A. Braunstein et al., "Survey propagation: An algorithm for satisfiability," Random Structures & Algorithms, 27(2):201-226 (2005). Other examples are described in A. Coja-Oghlan, "A better algorithm for random k-SAT," SIAM Journal on Computing, 39(7)-2823-2864 (2010).

To filter an input string 114, which can be considered a filter query to be applied or tested against the filters that the k-SAT solutions 110 are considered as representing, the input string 114 is converted to a k-SAT clause 116 having k number of literals 118A, 118B, ..., 118N, which are collectively referred to as the literals 118. The input string 114 is converted into the clause 116 using the same technique by which the training strings 102 were previously converted to the clauses 102. In the context of network security, the input string 114 can be a series of characters of an incoming (or outgoing) data packet, which is tested against the filters represented by the k-SAT solutions 110 to determine whether the string 114 and thus the packet represents a network security threat.

As represented by the block 120, then, the input string 116 is tested against the k-SAT solutions 110 to generate filter results 122. A k-SAT solution 110 is said to satisfy the clause 116 if the variable assignments 112 of the solution 110 render the clause 116 logically true, as noted above. In one implementation, if any k-SAT solution 110 does not satisfy the clause 116, then the filters represented by the solutions 110 are considered to have filtered out the input string 114 from which the clause 116 was converted. For example, in the context of network security, the input string 114 is not a potential threat. By comparison, if all of the k-SAT solutions 110 satisfy the clause, then the filters represented by the solutions 110 are considered to have filtered through the input string 114. In the context of network security, the input string 114 is a potential network security threat.

Figure 2:
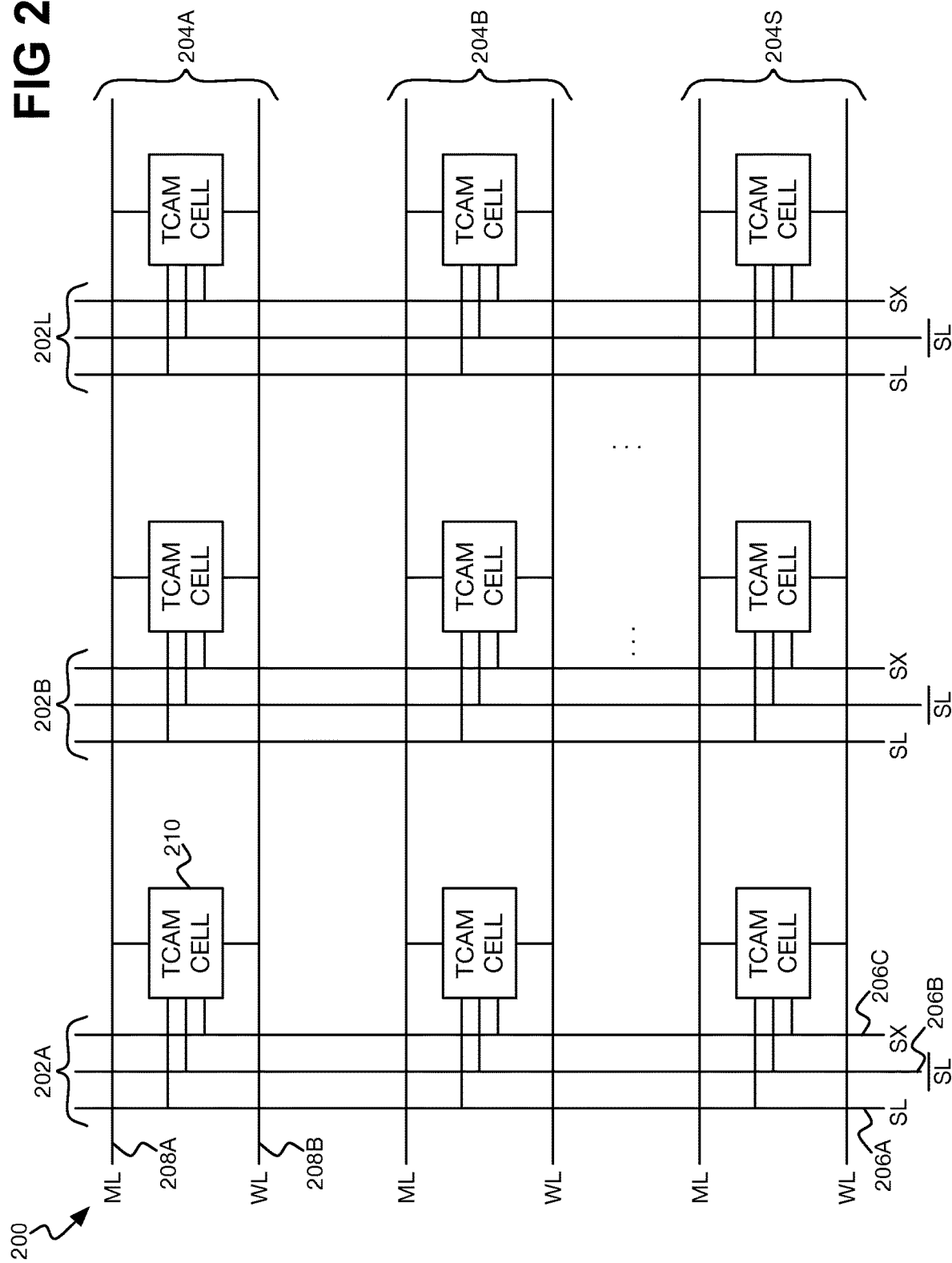
FIG. 2 is a diagram of an example TCAM that can be used in a k-SAT filtering technique.

FIG. 2 shows an example ternary content-addressable memory (TCAM) 200 that can be used in the k-SAT filtering technique 100. The TCAM 200 is programmed in correspondence with the k-SAT solutions 110 so that the TCAM 200 can be used to test the clause 116 of literals 118 corresponding to the input string 114 against the k-SAT solutions 110 within the block 120. The TCAM 200 is a type of content-addressable memory (CAM).

Specifically, in typical, non-CAM computer memory, such as random-access memory (RAM), the contents or data stored in the memory are looked up by memory address. By comparison, within a CAM, the memory is content addressable. To search the CAM, content is provided, instead of a memory address. A CAM is usually a binary CAM, which can just match binary values, such as logic zero and logic one. By comparison, a TCAM can match and store values based on three inputs: logic zero, logic one, and a "don't care" state.

The TCAM 200 includes input column line groups 202A, 202B, ..., 202L, which are collective referred to as the input column line groups 202. The number of column line groups 202 is equal to the number L of variables within the total set of variables $x_1, x_2, \ldots, x_L$, to which any literal 106, 112, or 118 of FIG. 1 can be set, either identically or as a negative thereof. The column line group 202 respectively correspond to the variables $x_1, x_2, \ldots, x_L$.

The TCAM 200 includes row line pairs 204A, 204B, ..., 204S, which are collectively referred to as the row line pairs 204. The number of row line pairs 204 is equal to the number S of k-SAT solutions 110 in FIG. 1. The row line pairs 204 respectively correspond to the k-SAT solutions 110.

Each input column line group 202 includes a search line 206A, or SL, and an inverted search line 206B, or $\overline{SL}$, and can also include in some implementations of a TCAM a "don't care" line 206C, or SX. Each row line pair 204 includes a match line 208A, or ML, and a write line 208B, or WL. The lines 206A, 206B, and 206C are collectively referred to as the lines 206, and the lines 208A and 208B are collectively referred to as the lines 208.

The TCAM 200 includes TCAM cells 210 at every intersection of an input column line group 202 and a row line pair 204. The TCAM cell 210 at an intersection of a given input column line group 202 and a given row line pair 204 is communicatively connected to every line 206 of this input column line 202. Such a TCAM cell 210 is further communicatively connected to every line 208 of this row line pair 204.

Each TCAM cell 210 may be implemented by memristors, in which case the TCAM 200 is a memristor-implemented TCAM. For example, each TCAM cell 210 may be implemented by one or two memristors. An example of such a two memristor-implemented TCAM cell that uses four transistors is described in L. Huang et al., "ReRAM-based 4T2R non-volatile TCAM with a 7× NVM-stress reduction, and 4× improvement in speed word length-capacity for normally-off instant-on filter-based search engines used in big-data processing," VLSI Symposium, June 2014, pp. 99-100. An example of a one memristor-implemented TCAM that uses three transistors is described in M. Chang et al., "A 3T1R non-volatile TCAM using MLC ReRAM with sub-1 ns search time," 2015 IEEE International Solid-State Circuits Conference, 2015, pp. 1-3.

The TCAM cells 210 are programmed in correspondence with the k-SAT solutions 110, and more specifically in correspondence with the variable assignments 112 of the k-SAT solutions 110. Because the input column line groups 202 corresponding to the total number of L variables, each TCAM cell 210 is programmed in correspondence with the variable assignment 112 to which the input column line group 202 at which the cell 210 is located corresponds, for the k-SAT solution 110 to which the output row line pair 204 at which the cell 210 is located corresponds.

For example, the column line group 202B can correspond to the second variable $x_2$ of the total set of L variables $x_1$, $x_2$, ..., $x_L$, and thus to the variable assignment 112B corresponding to this variable $x_2$. The row line pair 204S can correspond to the last, or s-th, k-SAT solution 110S of FIG. 1. The TCAM cell 210 at the intersection of the column line group 202B and the row line pair 204S stores a logic one if the variable assignment 112B for the variable $x_2$ is logic one within the k-SAT solution 110S. This TCAM cell 210 similarly stores a logic zero if the variable assignment 112B for the variable $x_2$ is logic zero.

Figure 3:
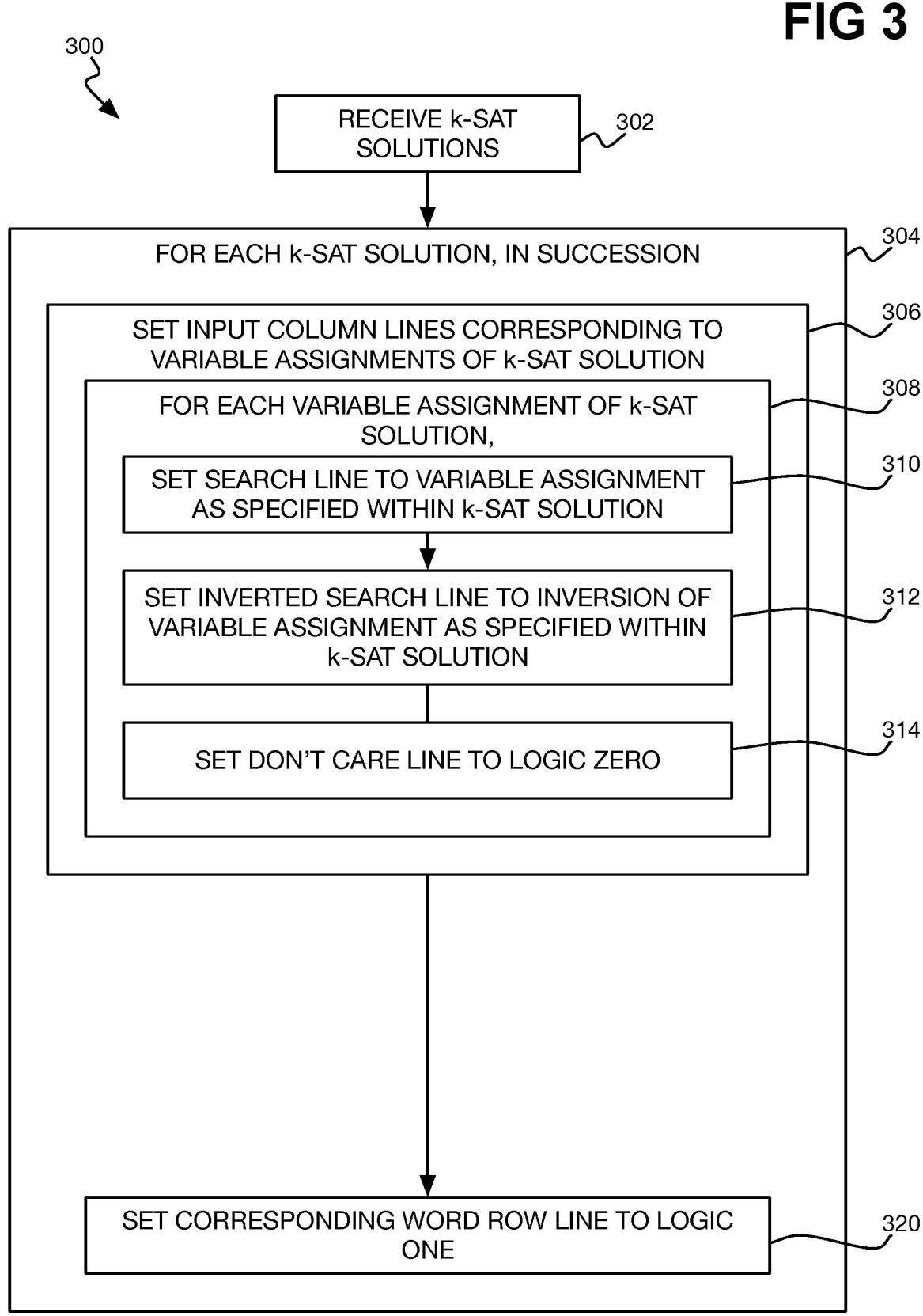
FIG. 3 is a flowchart of an example method for programming a TCAM in accordance with k-SAT solutions representing filters of a k-SAT filtering technique.

FIG. 3 shows an example method 300 for programming the TCAM 200 in accordance with the k-SAT solutions 110 representing the filters. The method 300 may be implemented as program code executable by a processor of a computing device that also includes the TCAM 200. The program code can be stored on a non-transitory computer-readable data storage medium.

The k-SAT solutions 110 to be programmed into the TCAM 200 are received (302). As such, the method 300 may begin after the training strings 102 have been converted into clauses 104 in block 103 of FIG. 1, and then after the solutions 110 themselves have been identified that satisfy each of these clauses 104 in block 108 of FIG. 1. As noted above, each solution 110 has a value for the assignment of every possible variable.

The following is then successively and separately performed for each k-SAT solution 110 (304). The input column line groups 202, which correspond to the variables, are set in accordance with the assignments 112 of the k-SAT solution 110 for these variables (306). Specifically, for each variable assignment 112 of the k-SAT solution 110 (308), the search line 206A of the column line group 202 corresponding to the variable specified by the assignment 112 is set to the variable assignment 112 (310). For example, if the variable assignment 112 for the variable is logic one, then the search line 206A can be set to logic one, and if the variable assignment 112 for this variable is logic zero, then the search line 206A can be set to logic zero.

The inverted search line 206B of the column line group 202 corresponding to the variable specified by the variable assignment 112 is similarly set to the inversion or negation of the variable assignment 112 (312). For example, if the variable assignment 112 is itself logic one, then the inverted search line 206B for the variable can be set to logic zero, since the negation or inversion of the variable assignment 112 is logic zero. Similarly, if the variable assignment 112 is itself logic zero, then the inverted search line 206B for the variable can be set to logic one, since the negation or inversion of the variable assignment 112 is logic one. The "don't care" line 206C of the column line group 202 corresponding to the literal 112 in question when present may be set to logic zero (314).

To then program the TCAM cells 210 within the row line pair 204 corresponding to the solution 110, the write line 208B of this row line pair 204 is asserted (320)—i.e., set to logic one—for a length of time before being deasserted again. The assertion of this write line 208B causes the values provided on the input column groups 202 to be programmed into the TCAM cells 210 along the write line 208B. That is, each TCAM cell 206 of the row line pair 204 in question is programmed according to the values presented on the input column groups 202 including the cell 206.

The TCAM cells 210 are thus programmed according to the k-SAT solutions 110 successively on a row line pair 204-by-row line pair 204 basis. The cells 210 along a given row line pair 204 are programmed simultaneously upon assertion of the write line 208B of the row line pair 204. Part 304 of the method 300 is performed s times, once for each of the s k-SAT solutions 110.

Figure 4:
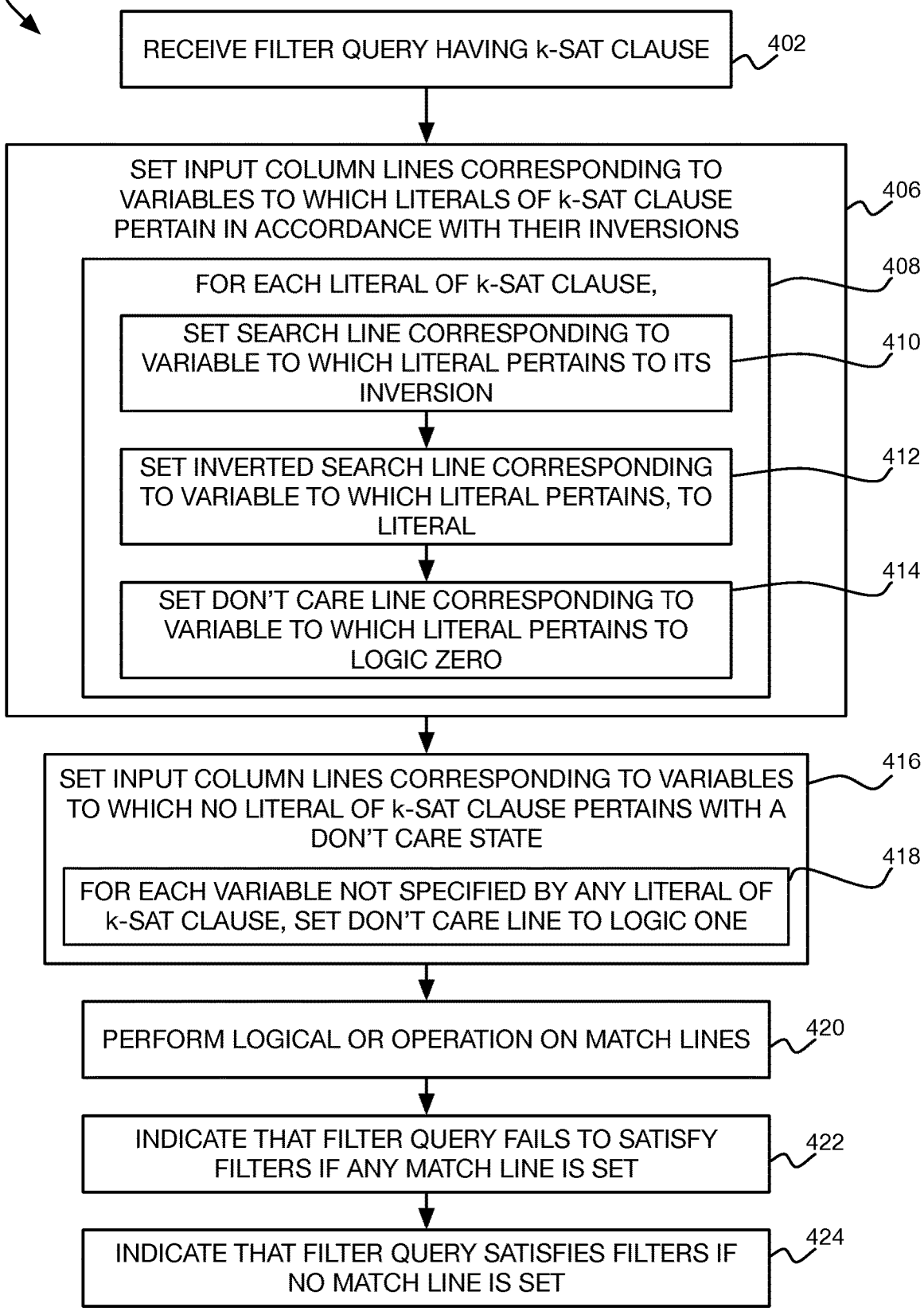
FIG. 4 is a flowchart an example method for filtering an input string using a k-SAT filtering technique, via a TCAM.

FIG. 4 shows an example method 400 for filtering the input string 114 using a k-SAT filtering technique, via the TCAM 200 that has been programmed in accordance with the k-SAT solutions 110 representing the filters. The method 400 can thus be performed after the method 300 of FIG. 3 has been performed. Like the method 300, the method 400 may be implemented as program code executable by a processor of a computing device that also includes the TCAM 200. The program code can be stored on a non-transitory computer-readable data storage medium.

A filter query having the k-SAT clause 116 corresponding to the input string 114 is received (402). The method 400 may thus begin after the input string 114 has been converted into the clause 116 in block 103 of FIG. 1. The filter query in this respect is said to be or include the k-SAT clause 116.

The input column line groups 202 corresponding to the variables specified by the literals 118 of the clause 116 are set in accordance with the inversions, or negations, of the literals 118 (406). Note that this is different from how the column line groups 202 corresponding to the variables of the variable assignments 112 of each k-SAT solution 110 were set in part 306 of the method 300. In part 306, the column line groups 202 were set in accordance with the variable assignments 112 of each k-SAT solution 110, and not in accordance with the inversions of these variable assignments 112. By comparison, in part 406, the column line groups 202 are set in accordance with the inversions of the literals 118.

Specifically, for each literal 118 of the clause 116 (408), the search line 206A of the column line group 202 corresponding to the variable to which the literal 118 pertains is set to the inversion or negation of the literal 118 (410). For example, if the literal 118 specifies a variable in non-negated or non-inverted form, then the search line 206A for this variable is set to logic zero, since the negation or inversion of logic one is logic zero. If the literal 118 specifies a variable in negated or inverted form, then the search line 206A for this variable can be set to logic one, since the negation or inversion of logic zero is logic one.

The inverted search line 206B of the column line group 202 corresponding to the variable to which the literal 118 pertains is similarly set to the literal 118 itself (412). For example, if the literal 118 specifies a variable in non-negated or non-inverted form, then the inverted search line 206B for this variable can be set to logic one, and if the literal 118 specifies a variable in negated or inverted form, then the inverted search line 206B for this variable can be set to logic zero. The "don't care" line 206C of the column line group 202 corresponding to the variable for the literal 118 in question when present may be set to logic zero (414). This is because the "don't care" state for the variable to which this literal 118 pertains is false, since the clause 116 in question does "care" or concern the variable to which literal 118 pertains insofar as the clause 116 specifies the literal 118.

By comparison, the input column line groups 202 that correspond to variables to which no literal 118 of the clause 116 pertains are set in accordance with the "don't care" state being true (416). Specifically, the "don't care" line 206C of each such column line group 202 when present can be set to logic one (418). The clause 116 does not "care" or concern the variable to which each such "don't care" line 206C corresponds, because the literals 118 of the clause 116 do not include a literal that references this variable. The search line 206A and the negated or inverted search line 206B corresponding to every variable to which none of the literals 118 pertain do not have to be provided, however, because asserting logic ones on the "don't care" lines 206C of the same column line groups 202 overrides the values on the lines 206A and 206B. In another implementation, regardless of whether the "don't care line" 206C is present, the search line 206A and the inverted search line 206B of the group lines 202 that correspond to variables to which no literal 118 of the clause 116 pertains are grounded in accordance with the "don't care" state being true in part 416.

The result of parts 406 and 416 can thus be that every input column line group 202 has its "don't care" line 206C specified, and if the clause 116 has a literal 118 pertaining to the variable to which the column line group 202 corresponds, its search line 206A and inverted search line 206B also specified. Upon setting the input column line groups 202 in accordance with parts 406 and 416, the match line 208A within each row line pair 204 indicates whether the clause 116 satisfies the k-SAT solution 110 to which the row line pair 204 corresponds. The match line 208A of a row line pair 204 is logic zero if the clause 116 satisfies the k-SAT solution 110 corresponding to the row line pair 204, and is logic one if the clause 116 does not satisfy this solution 110.

Setting the input column line groups 202 corresponding to the literals 118 of the k-SAT clause 116 in accordance with the inversions or negations of the variables specified by the literals 118 thus permits the clause 116 to be tested against each k-SAT solution 110 programmed within the TCAM cells 210 of the row line pair 204 to which the solution 110 corresponds. This is because the output on the match line 208A of the row line pair 204 to which a k-SAT solution 110 corresponds is a logical ORing of the outputs of the cells along this row line pair 204. A k-SAT clause 116 matches a k-SAT solution 110 if each variable assignment 112 of the solution 110 yields the literals 118 of the clause 116 to be logically true.

Therefore, by testing the inversions or negations of the variables to which the literals 118 pertain against the cells 210 of a row line pair 204, if any variable assignment 112 of the solution 110 does not yield the literals 118 of the clause 116 to be logically true, then the output of the match line 208A of the row line pair 204 is logic one. This means that the corresponding k-SAT solution 110 is not satisfied by the clause 116. By comparison, if the output of the match line 208A of the row line pair 204 in question is logic zero, this means that the corresponding solution 110 is satisfied by the clause 116.

In one implementation, a logical OR operation can be performed on the match lines 208 of the row line pairs 204. In network security and other types of filtering applications, the filters represented by the k-SAT solutions 110 are said to filter or match the clause 116 if the clause 116 satisfies all the k-SAT solutions 110. Therefore, the output of the logical OR operation indicates whether the filters have successfully filtered or matched the clause 116 or not. The output of the logical OR operation is logic zero if the filters have filtered or matched the clause 116, and is logic one if they have failed to filter or match the clause 116. That is, the output of the logical OR operation is logic zero if the clause 116 satisfies every k-SAT solution 110, and is logic one if the clause 116 fails to satisfy even just one solution 110 (i.e., the clause 116 fails to satisfy any one or more solutions 110).

Whether the filter query fails to satisfy the filters can thus be indicated if any match line is set (422). That is, the filter query can be indicated as failing to satisfy any one or more of the filters if the result of the logical OR operation is logic one. Whether the filter query satisfies the filters can by comparison be indicated if no match line is set (424). That is, the filter query can be indicated as satisfying all the filters if the result of the logical OR operation is logic zero. In this way, a TCAM 200 that has its cells 210 programmed in accordance with the k-SAT solutions 110 can, upon application of the inversion of the variables specified by the literals 118 of the k-SAT clause 116 to which the input string 114 has been converted, indicate whether the clause 116 satisfies every solution 110.

Figure 5:
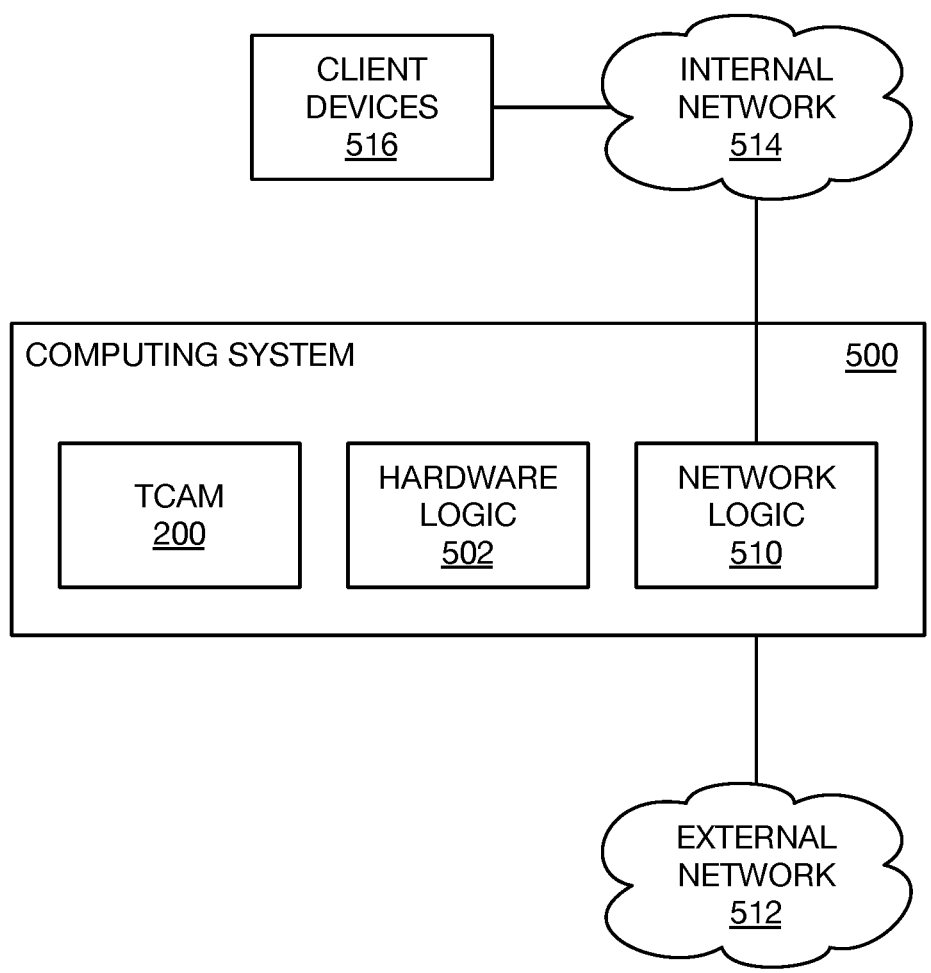
FIG. 5 is a diagram of an example system for filtering input strings using a k-SAT filtering technique, via a TCAM.

FIG. 5 shows an example system 500 for filtering filter queries. The system 500 may be implemented as one or more computing devices, for instance, such as servers. The system 500 includes the TCAM 200 that has been described, and hardware logic 502. The hardware logic 502 can perform the methods that have been described. The hardware logic 502 can be implemented as a processor and a non-transitory computer-readable data storage medium that stores code executable by the processor. The hardware logic 502 can instead be implemented as an application-specific integrated circuit (ASIC), or other specialized hardware.

The hardware logic 502 filters a filter query against filters represented by the k-SAT solutions 110 programmed in the TCAM 200, as has been described, such that the logic 502 performs block 120 of FIG. 1. The hardware logic 502 can also program the TCAM 200 in accordance with the solutions 110. In some implementations, the hardware logic 502 may perform the conversion of block 103 of FIG. 1, such that the logic 502 can convert an input string 114 to a k-SAT clause 116, and can also convert the training strings 102 to k-SAT clauses 104. In some implementations, the hardware logic 502 may implement block 108 of FIG. 1, such that the logic 502 can identify the solutions 110 that the clauses 104 satisfy.

FIG. 5 shows the specific case in which the computing system 500 can be used for network security purposes. As such, the computing system 500 includes network hardware 510, such as one or more network adapters, which communicatively connects the system 500 to both an external network 512 and an internal network 514. The external network 512 may be or include the Internet, for instance, whereas the internal network 514 may be local network like an intranet and/or a local-area network (LAN). Client computing devices 516 can also be connected to the internal network 514, such that the client computing devices 516 communicatively reach the external network 512 through the computing system 500.

Therefore, when a data packet arrives at the computing system 500 from over the external network 512, the computing system 500 may divide the packet, or at least its payload, into input strings, and upon the input strings being converted into k-SAT clauses, determining whether the clauses satisfy the k-SAT solutions programmed in the TCAM 200. Based on the filtering result of the input strings, the computing system 500 permits the data packet to pass through to the internal network 514 and to its destination client computing device 516 on the internal network 514, or prohibits the data packet from passing through. In the latter case, the system 500 thus identifies the data packet as containing an input string that potentially corresponds to a security threat. The data packet may be quarantined for further analysis to confirm whether or not the packet represents a network security threat. Filtering of outgoing data packets can be inspected in the same way as incoming data packets.

The techniques that have been described herein use TCAM, such as a memristor-implemented TCAM, to quickly determine whether a k-SAT clause satisfies k-SAT solutions. As such, these techniques can be employed to filter input strings, as well as in other scenarios, in which large numbers of input strings have to be tested in real time or near-real time. Therefore, the techniques described herein can be used in the context of network security, to identify incoming input strings as potential security threats.

We claim:

1. A method comprising:
receiving a filter query for a plurality of filters represented as k-SAT solutions, the filter query comprising a k-SAT clause having a plurality of literals pertaining to variables;
setting input column lines of a ternary content-addressable memory (TCAM) corresponding to the variables to which the literals of the k-SAT clause pertain in accordance with inversions of the literals, the TCAM having a plurality of cells programmed in correspondence with the k-SAT solutions;
setting input column lines of the TCAM corresponding to the variables to which no literal of the k-SAT clause pertains in accordance with a "don't care" state; and
indicating that the filter query fails to satisfy the filters responsive to any output match row line of the TCAM being set.

2. The method of claim 1, further comprising:
indicating that the filter query satisfies the filters responsive to no output match row line of the TCAM being set.

3. The method of claim 2, further comprising:
performing a logical OR operation on a plurality of output match row lines of the TCAM corresponding to the filters,
wherein indicating that the filter query fails to satisfy the filter comprises providing a logic one as output of the performed logical OR operation,
and wherein indicating that the filter query satisfies the filters comprises providing a logic zero as the output of the performed logical OR operation.

4. The method of claim 1, wherein the input column lines of the TCAM comprise, for each cell: a search line and an inverted search line.

5. The method of claim 4, wherein setting the input column lines of the TCAM corresponding to the variables to which the literals of the k-SAT clause pertain comprises, for the variable to which each literal of the k-SAT clause pertains:
setting the search line of the input column lines corresponding to the variable to the inversion of the literal; and
setting the inverted search line of the input column lines corresponding to the variable to the literal.

6. The method of claim 5, wherein the input column lines of the TCAM further comprise, for each cell, a "don't care" line,
and wherein setting the input column lines of the TCAM corresponding to the variables to which no literal of the k-SAT clause pertains comprises, for each literal of a plurality of literals other than the literals of the k-SAT clause:
setting the "don't care" line of the input column lines corresponding to the variables to which no literal of the k-SAT clause pertains to logic one.

7. The method of claim 1, further comprising:
programming the cells of the TCAM in correspondence with the k-SAT solutions representing the filters.

8. The method of claim 7, wherein the input column lines of the TCAM comprise, for each cell: a search line and an inverted search line, wherein each k-SAT solution has a plurality of variable assignments for the variables, and wherein programming the cells of the TCAM comprises, individually for each k-SAT solution:
setting the input column lines of the TCAM corresponding to the variables in accordance with the variable assignments for the variables as specified by the k-SAT solution; and
setting a write row line of the TCAM corresponding to the k-SAT solution to logic one.

9. The method of claim 8, wherein setting the input column lines of the TCAM corresponding to the variables in accordance with the variable assignments for the variables as specified by the k-SAT solution comprises, for each variable:
setting the search line of the input column lines corresponding to the variable to the variable assignment for the variable as specified by the k-SAT solution;
setting the inverted search line of the input column lines corresponding to the variable to the inversion of the variable assignment for the variable as specified by the k-SAT solution.

10. The method of claim 9, wherein the input column lines of the TCAM further comprise, for each cell, a "don't care" line,
and wherein setting the input column lines of the TCAM corresponding to the literals of the k-SAT solution further comprises, for each variable:
setting the "don't care" line of the input column lines corresponding to the variable to logic zero.

11. The method of claim 1, wherein the TCAM is a memristor-implemented TCAM, each cell having a plurality of memristors.

12. A non-transitory computer-readable data storage medium storing instructions executable by a processor to:
receiving a plurality of k-SAT solutions, each k-SAT solution specifying a set of variable assignments of a plurality of variables;
separately for each k-SAT solution:
setting input column lines of a ternary content-addressable memory (TCAM) in accordance with the variable assignments specified by the k-SAT solution, each input column line corresponding to one of the variables, wherein the input column lines of the TCAM comprise, for each cell of a plurality of cells of the TCAM: a search line and an inverted search line and wherein setting the input column lines of the TCAM in accordance with the variable assignments specified by the k-SAT solution comprises, for each variable:
setting the search line of the input column lines corresponding to the variable to the variable assignment for the variable as specified by the k-SAT solution; and
setting the inverted search line of the input column lines corresponding to the variable to an inversion of the variable assignment for the variable as specified by the k-SAT solution; and setting a write row line of the TCAM corresponding to the k-SAT solution to logic one.

13. The non-transitory computer-readable data storage medium of claim 12, wherein the input column lines of the TCAM further comprise, for each cell, a "don't care" line, and wherein setting the input column lines of the TCAM in accordance with the variable assignments specified by the k-SAT solution comprises, for each variable:

setting the "don't care" line of the input column lines corresponding to the variable to logic zero.

14. A system comprising:

a ternary content-addressable memory (TCAM) having:
   a plurality of input column lines that each correspond to a variable of a plurality of variables;
   a plurality of output match row lines that each correspond to a k-SAT solution of a plurality of k-SAT solutions representing a plurality of filters; and
   a plurality of cells that are programmed in correspondence with the k-SAT solutions; and hardware logic to:
   set the input column lines corresponding to the variables to which a plurality of literals of a k-SAT clause of a filter query pertain in accordance with inversions of the literals specified by the k-SAT clause;
   set the input column lines corresponding to the variables to which no literal of the k-SAT clause of the filter pertains in accordance with a "don't care" state; and
   filter the filter query against the filters based on whether any output match row line of the TCAM is set responsive to setting the input column lines.

15. The system of claim 14, wherein each cell corresponds to a sub-plurality of the input column lines, wherein each cell corresponds to one of the output match row lines, and wherein each cell is programmed in correspondence with a variable assignment of the variable to which the input column lines corresponding to the cell corresponds within the k-SAT solution to which the output match row line corresponding to the cell corresponds.

16. The system of claim 14, wherein the hardware logic is to filter the filter query against the filters by:

indicating that the filter query fails to satisfy the filters responsive to any output match row line of the TCAM being set; and indicating that the filter query satisfies the filters responsive to no output match row line of the TCAM being set.

17. The system of claim 14, wherein the input column lines of the TCAM comprise, for each cell: a search line, an inverted search line, and a "don't care" line, wherein the hardware logic is to set the input column lines corresponding to the variables to which the literals specified by the k-SAT clause of the filter pertain by, for each literal of the k-SAT clause:
   setting the search line of the input column lines corresponding to the variable to which the literal pertains to the inversion of the literal;
   setting the inverted search line of the input column lines corresponding to the variable to which the literal pertains to the literal; and
   setting the "don't care" line of the input column lines corresponding to the variable to which the literal pertains to logic zero, and wherein the hardware logic is to set the input column lines corresponding to the variables to which no literal specified by the k-SAT clause of the filter pertains by:
   setting the "don't care" line of the input column lines corresponding to the variables to which no literal specified by the k-SAT clause of the filter pertains to logic one.

18. The system of claim 14, wherein the filter query represents an input string received over a network, and wherein the hardware logic is to filter the filter query by:

determining that the input string is not a potential network security threat and immediately permitting the input string to pass responsive to any output match row line of the TCAM being set; and determining that the input string is a potential network security threat and not immediately permitting the input string to pass responsive to no output match row line of the TCAM being set.

19. The system of claim 14, wherein the TCAM is a memristor-implemented TCAM, each cell having a plurality of memristors.

* * * * *